United States Patent [19]

Nakamura et al.

[11] Patent Number: 4,887,107
[45] Date of Patent: Dec. 12, 1989

[54] CAMERA

[75] Inventors: Ikushi Nakamura; Hiroshi Ootsuka, both of Sakai; Akira Fukushima, Osaka; Yoshinobu Kudo, Sakai; Yoshiaki Hata, Toyonaka; Manabu Inoue, Kobe; Norihiro Inoue, Nara, all of Japan

[73] Assignee: Minolta Camera Kabushiki Kaisha, Osaka, Japan

[21] Appl. No.: 333,861

[22] Filed: Apr. 6, 1989

[30] Foreign Application Priority Data

Jul. 29, 1986 [JP] Japan .................. 61-178396
Jul. 29, 1986 [JP] Japan .................. 61-178397
Jul. 29, 1986 [JP] Japan .................. 61-178398
Jul. 29, 1986 [JP] Japan .................. 61-178399

[51] Int. Cl.$^4$ .............................. G03B 3/00
[52] U.S. Cl. ............................. 354/195.12
[58] Field of Search ..................... 354/195.12

[56] References Cited

U.S. PATENT DOCUMENTS 4,451,129 5/1984 Ikari et al. ................. 354/477

FOREIGN PATENT DOCUMENTS 52-76919 6/1977 Japan .
57-146231 9/1982 Japan .
58-83807 5/1983 Japan .
58-126433 8/1983 Japan .
59-29214 2/1984 Japan .
61-32828 2/1986 Japan .
61-32829 2/1986 Japan .
61-133933 6/1986 Japan .
61-165742 7/1986 Japan .
61-251831 11/1986 Japan .
62-42132 2/1987 Japan .

Primary Examiner—Michael L. Gellner
Attorney, Agent, or Firm—Burns, Doane, Swecker & Mathis

[57] ABSTRACT

A camera comprising a main lens component disposed in a photographic optical path, and a first and a second auxiliary lens components movable into and out of the photographic optical path. The main lens component provides a standard focal length. The first auxiliary lens component is pivotable about an axis extending parallel to an optical axis of the main lens component. When in the optical path, the first auxiliary lens component, in combination with the main lens component, provides a long focal length. The second auxiliary lens component is pivotable about an axis extending parallel to a straight line perpendicular to the optical axis of the main lens component. When in the optical path, the second auxiliary lens component, in combination with the main lens component, provides a short focal length.

16 Claims, 12 Drawing Sheets

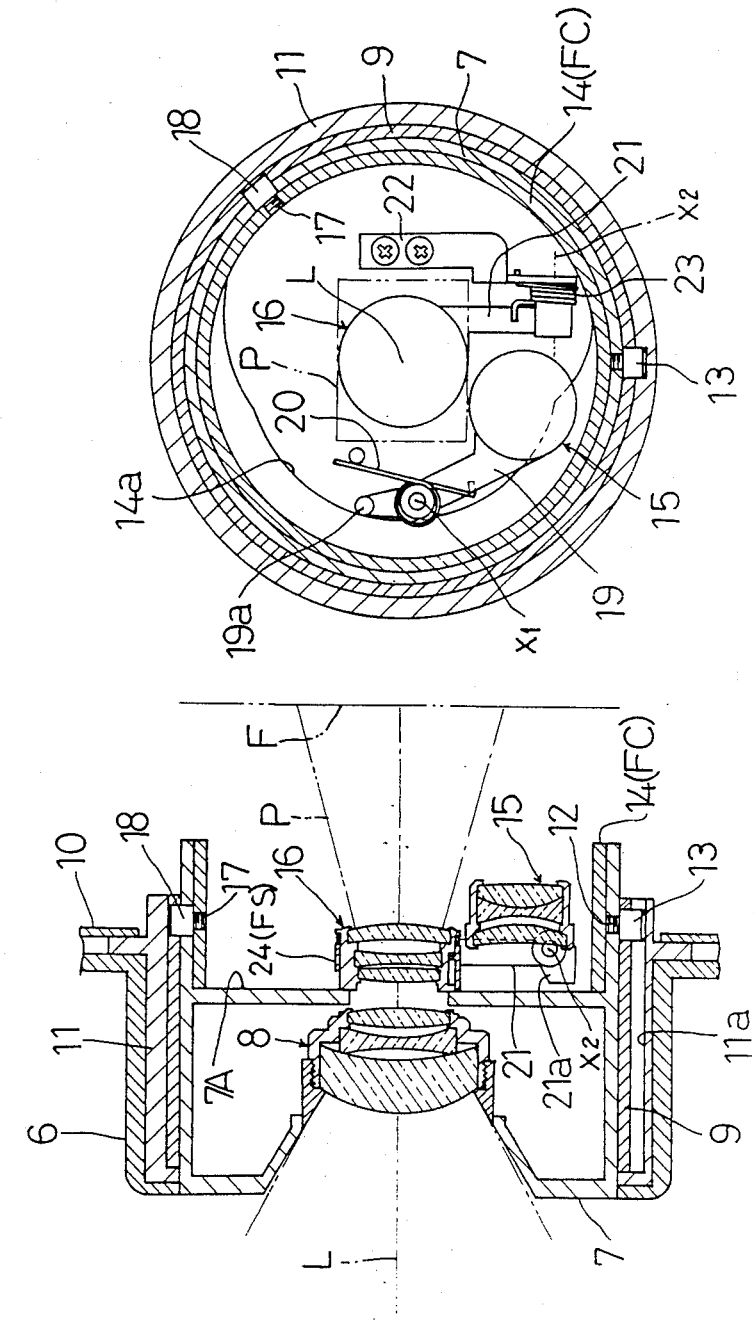

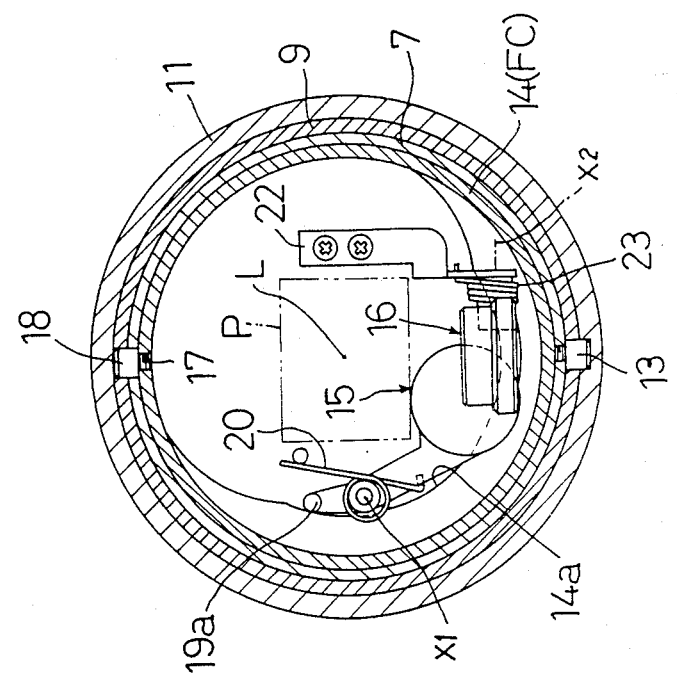
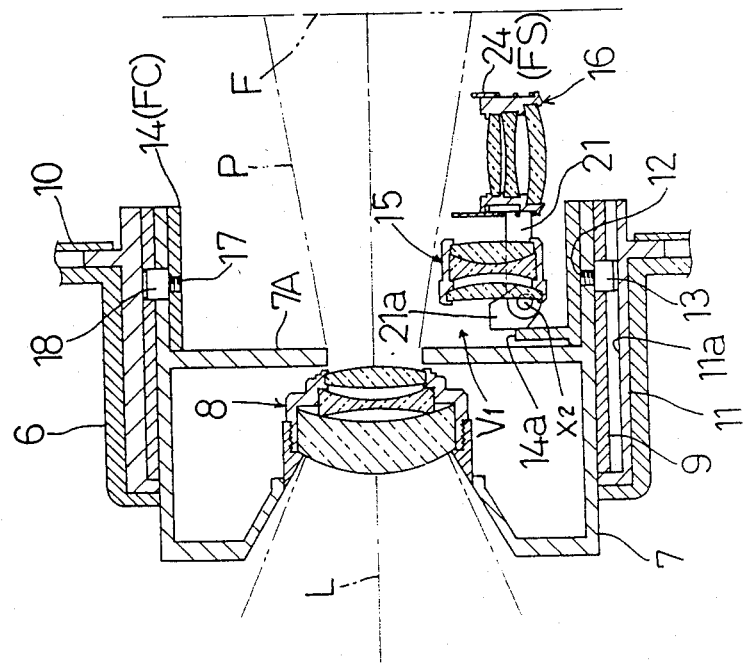
FIG. 7
FIG. 6

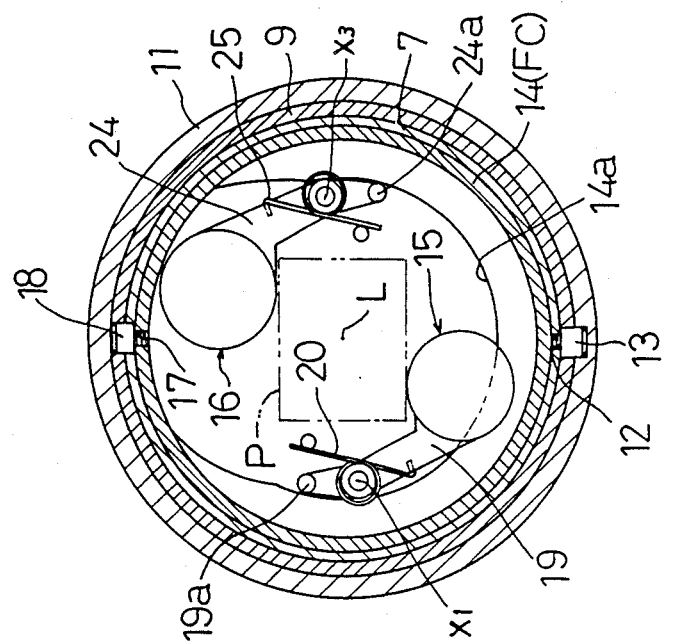
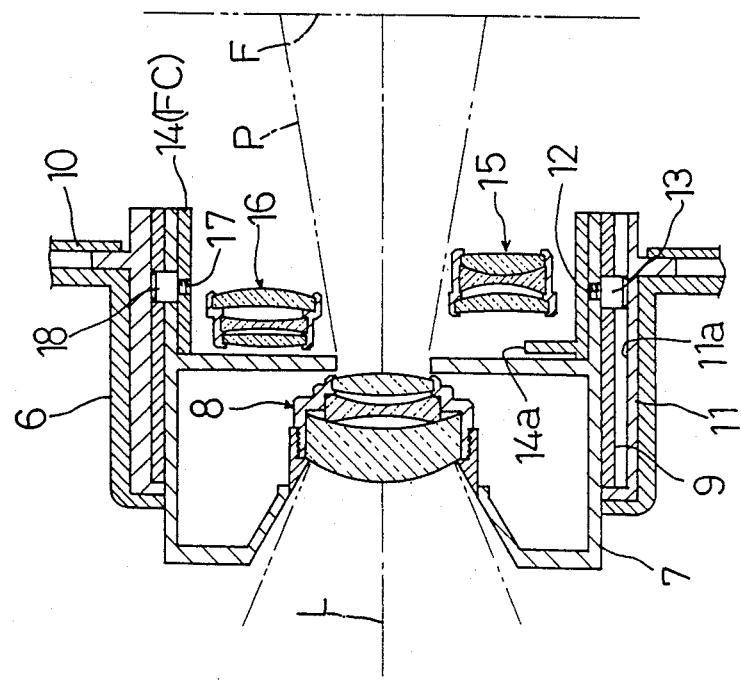
FIG.13
FIG.12

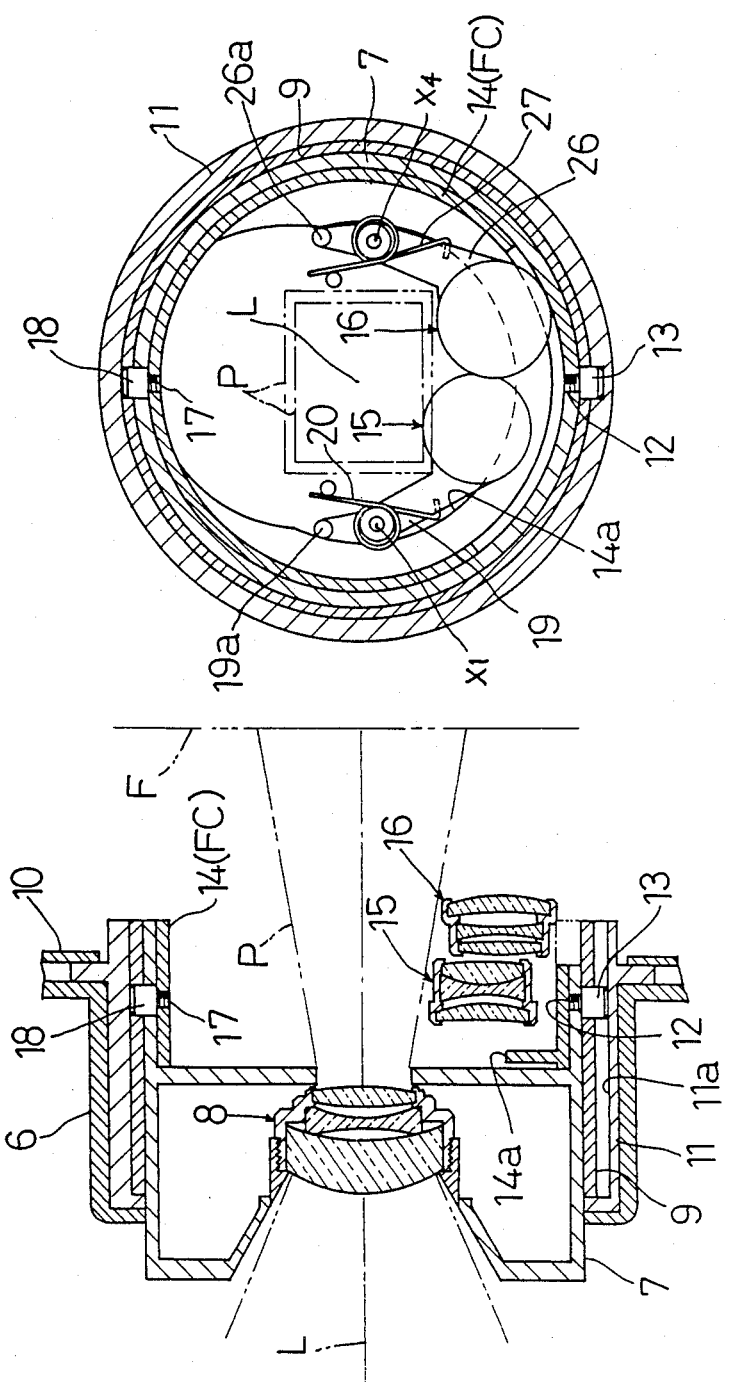

CAMERA

BACKGROUND OF THE INVENTION

1. Field of the Invention

The present invention relates to a camera comprising a photographic lens assembly having a plurality of focal lengths, and more particularly to a camera including a main lens component and auxiliary lens components movable into a photographic optical path provided by the main lens component to establish compound focal lengths different from a focal length of the main lens component.

2. Description of the Prior Art

The above camera on its own provides different focal lengths for taking photographs having different perspectives and compositions with ease. Particularly a wide variety of small cameras have been developed to enable diverse expressions with an increasingly simplified operation.

Existing examples of this type include a camera with the focal length variable in two stages, which is known as bifocal camera. The bifocal camera is capable of standard photography and wide angle photography with an auxiliary lens component, in combination with a main lens component, providing a shorter compound focal length than a focal length of the main lens component, or of standard photography and telephotography with an auxiliary lens component, in combination with the main lens component, providing a compound longer focal length than the focal length of the main lens component.

In either case, however, the bifocal camera has a photographic lens systems providing two focal lengths, and hence only limited variations in the perspective and construction. On the other hand, it is desirable in actual photo-taking to be capable of readily taking photographs with photographic purposes according to various photographic conditions, such as closeup portraits, shots of groups of people, and long shots of scenery.

SUMMARY OF THE INVENTION

Having regard to the state of the art noted above, a primary object of the present invention is to provide a multi-focus camera allowing expressions of increased diversity with a simple operation.

In order to fulfill this object, a camera according to the present invention comprises a main lens component disposed in a photographic optical path, a first auxiliary lens component movable into and out of the photographic optical path and cooperable with the main lens component to provide a long compound focal length, a second auxiliary lens component movable into and out of the photographic optical path and cooperable with the main lens component to provide a short compound focal length, a control mechanism for selecting one of the long focal length, the short focal length and an intermediate focal length, and a switch mechanism operable in response to the control mechanism to bring the second auxiliary lens component into the photographic optical path and retract the first auxiliary lens component from the photographic optical path when the short focal length is selected, to retract both the first auxiliary lens component and the second auxiliary lens component from the photographic optical path when the intermediate focal length is selected, and to bring the first auxiliary lens component into the photographic optical path and retract the second auxiliary lens component from the photographic optical path when the long focal length is selected.

The above construction allows photographs to be taken with three different focal lengths simply by operating the control mechanism. Specifically, the standard photography is available by the main lens component alone, the telephotography is made possible by bringing the first auxiliary lens component into the photographic optical path, and the wide angle photography is made possible by bringing the second auxiliary lens component into the photographic optical path.

More particularly, this construction has for a basis the lens system for the standard photography, and enables the telephotography and wide angle photography by adding the two auxiliary lens components to this basic lens system, respectively. This permits the focal lengths provided by the first and second auxiliary lens components to be varied only by small amounts from the focal length provided by the basic lens system. Therefore, excellent image-forming characteristics are maintained with ease in the lens system for telephotography and in the lens system for wide angle photography.

Since the second auxiliary lens component for effecting the wide angle photography in combination with the main lens component provides a focal length with a small amount of variation, its aperture may be small and therefore the second auxiliary lens component per se may be inexpensive. This feature also permits the second auxiliary lens component to be contained in a small space when retracted from the photographic optical path.

In an advantageous construction for moving the two auxiliary lens components into and out of the photographic optical path according to the present invention, the first auxiliary lens component is pivotable about an axis extending parallel to the optical axis, and the second auxiliary lens component is pivotable about an axis extending parallel to a straight line perpendicular to the optical axis. Even where one of the auxiliary lens components has a relatively large diameter, this component may be used as the second auxiliary lens component, whereby the auxiliary lens components may be contained in an accommodating space having minimum dimensions from the optical axis.

Particularly where the two auxiliary lens components in retracted positions are both disposed in one of spaces divided by a plane including the optical axis, other components of the camera may be mounted in the space opposite to the accommodating space for the two auxiliary lens components. This constitutes an effective use of the camera interior.

It is further advantageous if, according to another embodiment of this invention, the auxiliary lens components are retractible into a space formed when the main lens component moves from a rear end to a front end along the optical axis. This feature is effective to reduce the accommodating space for the auxiliary lens components in the camera interior.

With this type of camera, when one of the auxiliary lens components lies in the photographic optical path, the main lens component is at the rear end along the optical axis, namely at a position in its range of movement closest to a film surface. When the auxiliary lens component is retracted from the photographic optical path, the main lens component is at the front end along the optical axis, namely at a position in its range of movement remotest from the film surface.

The space used for the movement of the main lens component in the above range along the optical axis is in substance secured only for the movement of the main lens component. This space is left unused when the main lens component is at the front end along the optical axis.

Perceiving this fact and the fact that the auxiliary lens component is retracted from the photographic optical path when the main lens component is at the front end along the optical axis, the present invention utilizes the above space left unused for retracting the auxiliary lens component into this space. This is effective to minimize the accommodating space for the auxiliary lens component in the camera body, namely the extent of the retracted auxiliary lens component projecting into the camera body.

Other objects, features and advantages of the present invention will be apparent from the following description.

BRIEF DESCRIPTION OF THE DRAWINGS

FIG. 4 is a view in vertical section of the photographic lens assembly in the wide mode.

FIG. 5 is a view in cross section of the photographic lens assembly in the wide mode.

FIG. 6 is a view in vertical section of the photographic lens assembly in the standard mode.

FIG. 7 is a view in cross section of the photographic lens assembly in the standard mode.

FIG. 12 is a view in vertical section of a photographic lens assembly in the standard mode according to a further embodiment, which corresponds to FIG. 6.

FIG. 13 is a view in cross section of the photographic lens assembly of FIG. 12 in the standard mode, which corresponds to FIG. 7.

FIG. 14 is a view in vertical section of a photograhic lens assembly in the standard mode according to a still further embodiment, which corresponds to FIG. 6.

FIG. 15 is a view in cross section of the photographic lens assembly of FIG. 14 in the standard mode, which corresponds to FIG. 7.

DETAILED DESCRIPTION OF THE PREFERRED EMBODIMENTS

Embodiments of the present invention will be described hereinafter with reference to the drawings.

Figure 1:
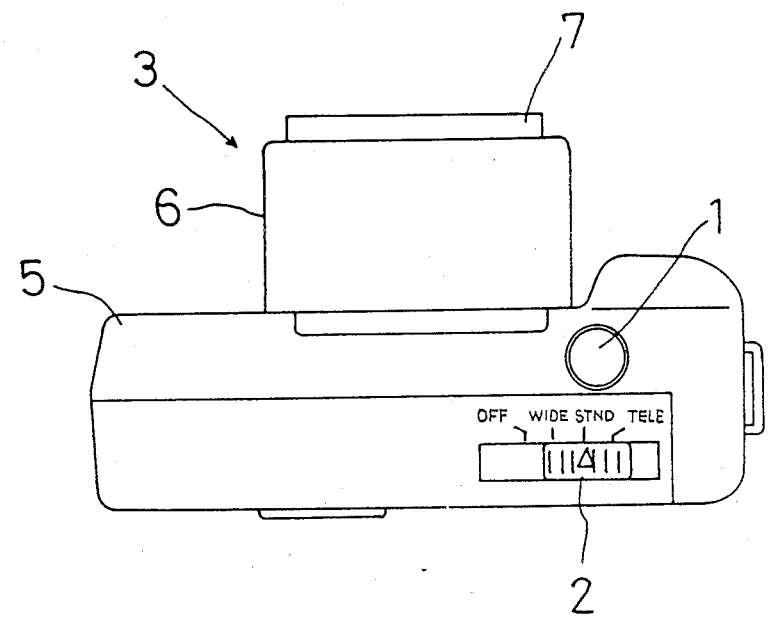
FIG. 1 is a plan view of a camera embodying the present invention.

FIG. 1 is an overhead view of a camera embodying the invention, which comprises a release button 1, a mode changeover switch 2, and a photographic lens assembly 3.

The mode changeover switch 2 is movable to a TELE position to provide a telemode wherein the photographic lens assembly 3 has a maximum compound focal length, a WIDE position to provide a wide mode wherein the photographic lens assembly 3 has a minimum compound focal length, and a STND position to provide a standard mode wherein the photographic lens assembly 3 has an intermediate focal length.

When the mode changeover switch 2 is set to an OFF position, power supply to all sections of the camera is stopped.

The photographic lens assembly 3 includes a fixed barrel 6 continuous with a camera body 5 and a movable lens support barrel 7 movable into and out of the fixed barrel 6.

Figure 8:
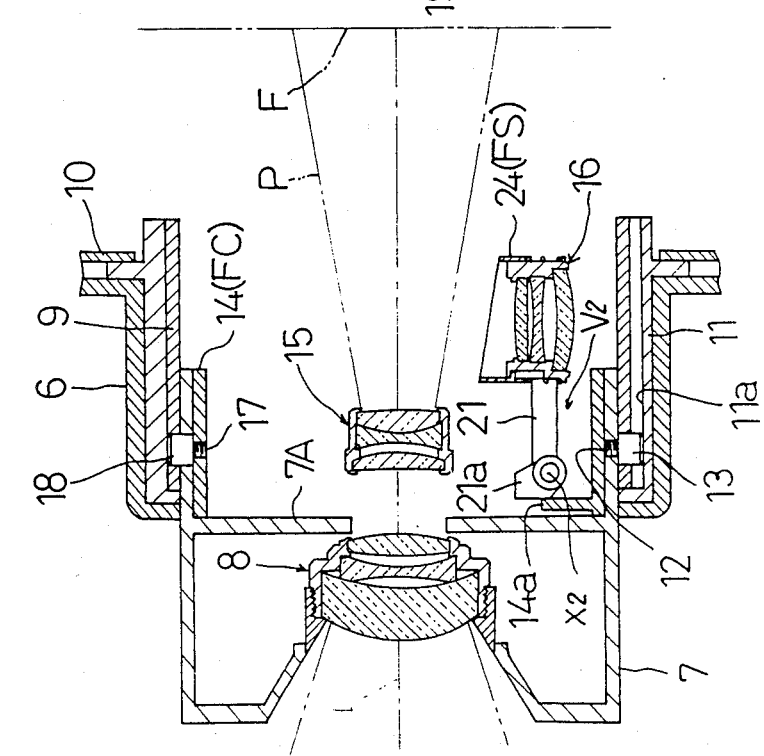
FIG. 8 is a view in vertical section of the photographic lens assembly in the telemode.

As shown in FIGS. 4, 6 and 8, the movable lens support barrel 7 supports a main lens component 8 of three elements in three groups linked with an automatic focus adjusting mechanism (not shown) to be movable along an optical axis L to effect focus adjustment. The movable lens support barrel 7 is fitted in a cam ring 9 rotatable about the optical axis L, and the cam ring 9 is fitted in a stationary barrel 11 which is rigidly connected to the camera body 5 through a base plate 10.

Figure 3:
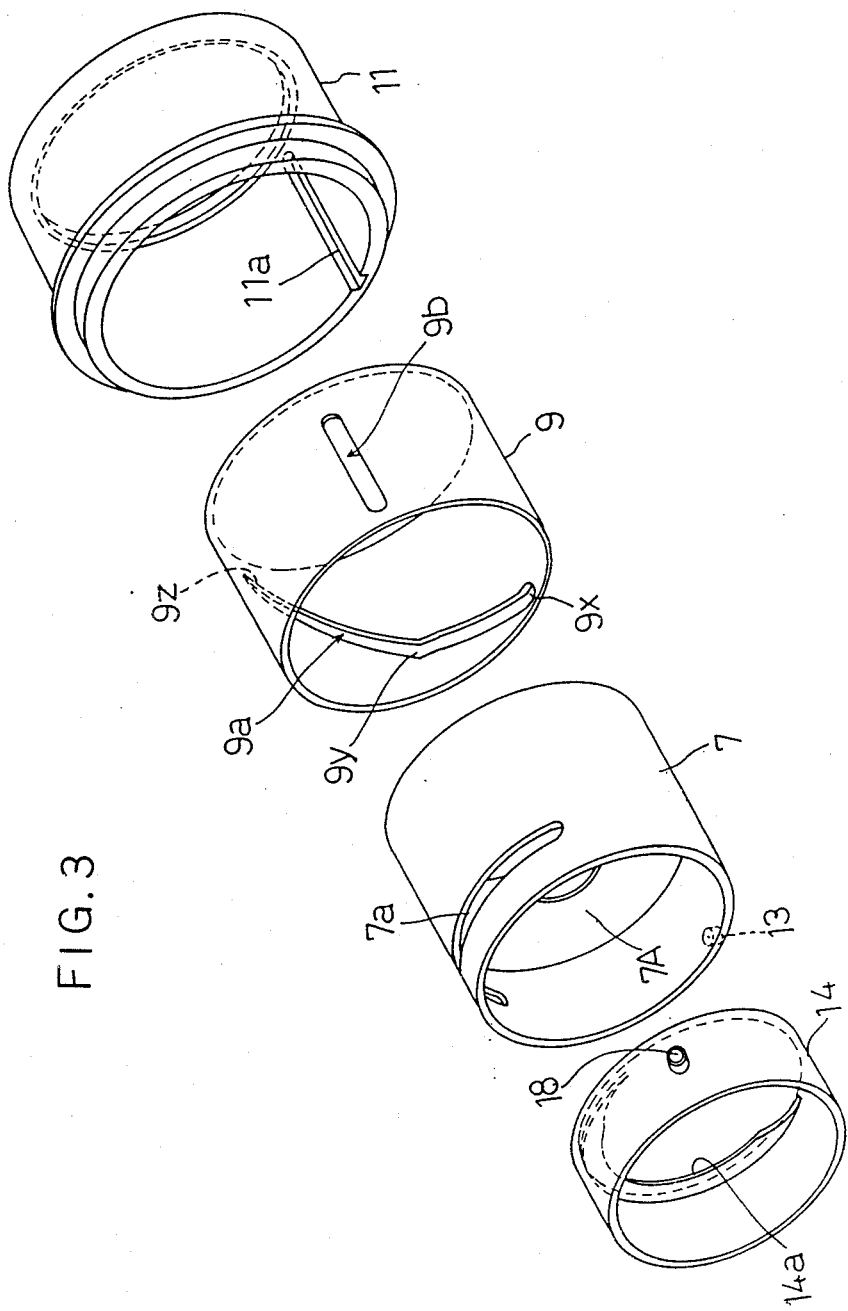
FIG. 3 is an exploded perspective view of the photographic lens assembly.

As shown in FIG. 3, the cam ring 9 defines a cam groove 9a for receiving a roller 13 rotatably attached to a guide pin 12 projecting from an outer periphery of the movable lens support barrel 7. The roller 13 penetrates the cam groove 9a into engagement with a straight groove 11a defined in an inner periphery of the stationary barrel 11 and extending along the optical axis L. Thus, the movable lens support barrel 7 is movable along the optical axis L with rotations of the cam ring 9 about the optical axis L.

As shown in FIGS. 2A, 2B, 2C and 3 through 9, a switching ring 14 is fitted in the movable lens support barrel 7 to be rotatable about the optical axis L. The switching ring 14 constitutes a focal length switching mechanism FC which is rotatable to protrude and retract two auxiliary lens components 15 and 16, which will be described later, relative to a photograhic optical path P thereby to switch focal lengths.

The switching ring 14 includes a control pin 17 projecting from an outer periphery thereof and rotatably carrying a roller 18. The roller 18 penetrates a peripheral groove 7a defined in the movable lens support barrel 7 into engagement with a straight groove 9b defined in the cam ring 9 and extending along the optical axis L. Thus, the rotations of cam ring 9 cause both the movable lens support barrel 7 and switching ring 14 to rotate about the optical axis L while moving along the optical axis L.

Though not shown, the cam ring 9 is operatively connected through an interlocking mechanism to a reversible motor. This motor is rotatable in response to operations of the changeover switch 2 described hereinbefore.

Further, as shown in FIGS. 2A, 2B, 2C and 3 through 9, the movable lens support barrel 7 carries the two auxiliary lens components 15 and 16 for cooperating with the main lens component 8 to realize compound focal lengths different from a focal length of the main lens component 8 alone.

Figure 2A:
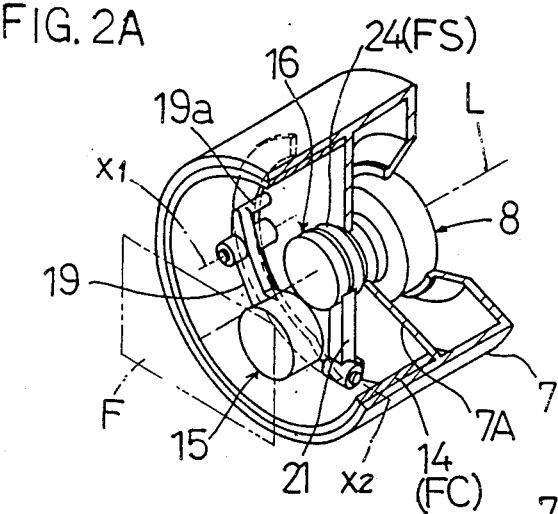
FIGS. 2A, 2B and 2C are perspective views, partly broken away, of a photographic lens assembly, respectively, FIG. 2A showing a wide mode position, FIG. 2B showing a standard mode position, and FIG. 2C showing a telemode position.
Figure 2B:
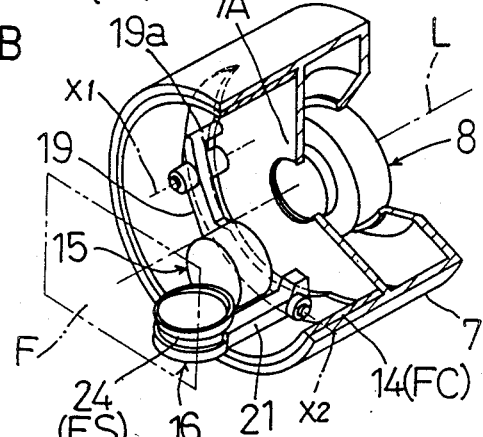
Figure 2C:
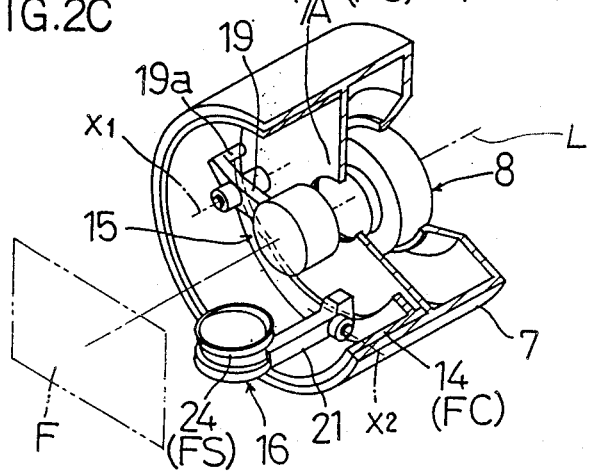
Figure 9:
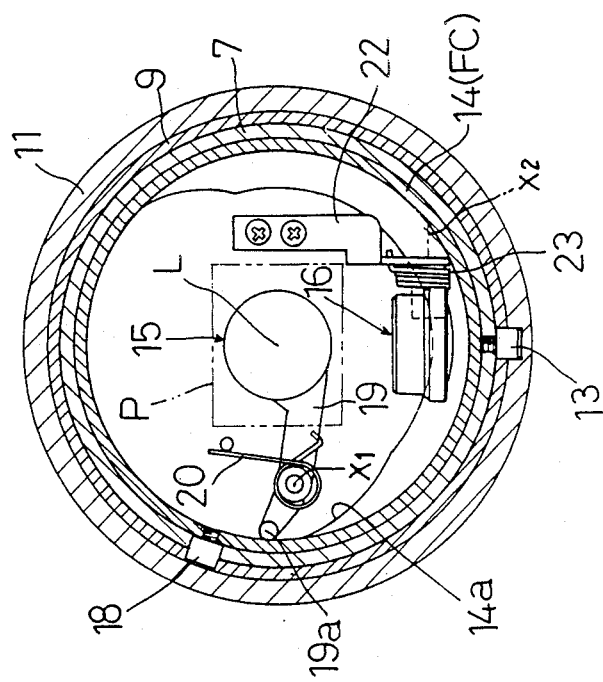
FIG. 9 is a view in cross section of the photographic lens assembly in the telemode.

The first auxiliary lens component 15 has a construction of three elements in two groups. As shown in FIGS. 2C, 8 and 9, the first auxiliary lens component 15 is placed in the photographic optical path P rearwardly of the main lens component 8 supported by the movable lens support barrel 7 when the main lens component 8 is at a maximum distance to a film surface F. In this state, the combination of main lens component 8 an first auxiliary lens component 15 provides a compound focal length longer than the focal length of the main lens component 8.

The first auxiliary lens component 15 is supported by a support frame 19 attached to the movable lens support barrel 7 to be pivotable on an axis X1 extending parallel to the optical axis L, whereby the first auxiliary lens component 15 is movable into and out of the photographic optical path P. The support frame 19 is biased by a spring 20 in a direction to protrude the first auxiliary lens component 15 into the photographic optical path P (which is the counterclockwise direction in FIGS. 5, 7 and 9).

The support frame 19 includes a control pin 19a at an end opposite to the frst auxiliary lens component 15 across the axis X1. The support frame 19 is pivotable about the axis X1 against the biasing force of spring 20 to retract the first auxiliary lens component 15 from the photographic optical path P when the switching ring 14 rotates and its cam portion 14a contacts and pushes the control pin 19a.

The second auxiliary lens component 16 has a construction of three elements in three groups. As shown in FIGS. 2A, 4 and 5, the second auxiliary lens component 16 is placed in the photographic optical path P rearwardly of the main lens component 8 when the main lens component 8 is at a minimum distance to the film surface F. In this state, the combination of main lens component 8 and second auxiliary lens component 16 provides a compound focal length shorter than the focal length of the main lens component 8.

The second auxiliary lens component 16 is supported by a support frame 21 pivotable on an axis X2 extending parallel to a straight line perpendicular to the optical axis L, whereby the second auxiliary lens component 16 is movable into and out of the photographic optical path P. The support frame 21 is supported by the movable lens support barrel 7 through a mounting plate 22 and biased by a spring 23 in a direction to protrude the second auxiliary lens component 16 into the photographic optical path P (which is the counterclockwise direction in FIGS. 4, 6 and 8).

The support frame 21 includes an abutment portion 21a opposed to the second auxiliary lens component 16 across the axis X2. The support frame 21 is pivotable about the axis X2 against the biasing force of spring 23 to retract the second auxiliary lens component 16 from the photographic optical path P when the switching ring 14 rotates and its cam portion 14a contacts and pushes the abutment portion 21a.

The ratio of the focal length provided by the combination of first auxiliary lens component 15 and main lens component 8 with respect to the focal length provided by the main lens component 8 alone should preferably be substantially equalized to the the ratio of the focal length provided by the main lens component 8 alone with respect to the focal length provided by the combination of secon auxiliary lens component 16 and main lens component 8. This will allow the view angle to be varied at the same rate of change when switching the focal lengths, which results in a combination of focal lengths offering the greatest ease to the user. Furthermore, this arrangement will allow views through the viewfinder to change in a natural, desirable way.

The area defined in a two-dot and dash line in FIGS. 5, 7 and 9 represents a section of the photographic optical path P on the plane of movement of the first auxiliary lens component 15 corresponding to a frame on the film surface F.

The support frame 21 supporting the second auxiliary lens component 16 carries a light interrupting ring 24 acting as light interrupting member FS for preventing a beam having passed the main lens component 8 from falling on the second auxiliary lens component 16 in the retracted position. To be particular, the second auxiliary lens component 16 in the retracted position has a lens surface 16a extending substantially parallel to the optical axis L. Therefore, the beam having passed through the main lens component 8 could be reflected by the lens surface 16a to travel to the film surface F as a flare. This would fog an image or otherwise lower the sharpness of the image. The light interrupting ring 24 acts to prevent the beam incident on the second auxiliary lens component 16 in the retracted position. Accordingly, though the lens surface 16a of the second auxiliary lens component 16 extends substantially parallel to the optical axis L, the flare is effectively avoided which would deteriorate image quality. Further, the provision of the light interrupting ring 24 minimizes a space for accommodating the second auxiliary lens component 16, thus contributing toward compactness of the entire camera.

Figure 10A:
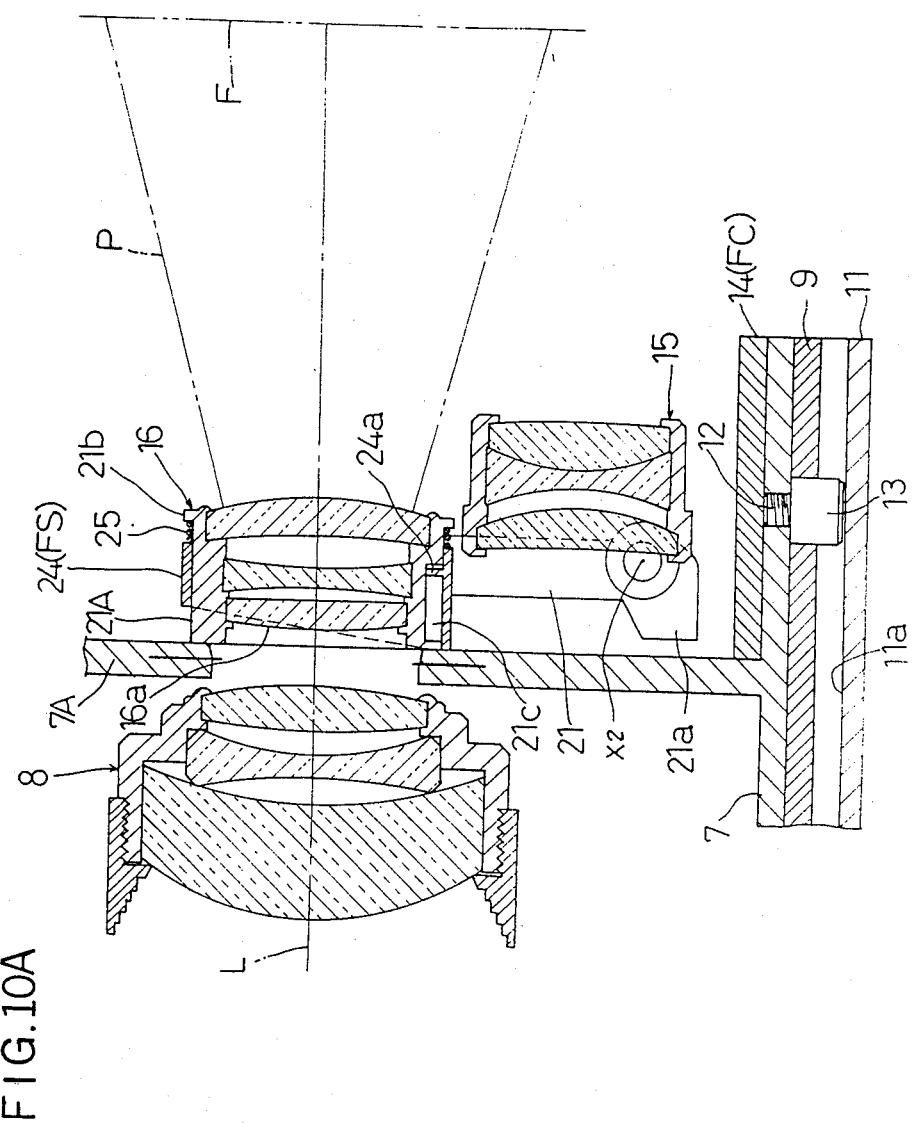
FIGS. 10A and 10B are views in vertical section of the photographic lens assembly including auxiliary lens components and a light interrupting member, respectively, FIG. 10A illustrating the wide mode, and FIG. 10B illustrating the standard mode.
Figure 10B:
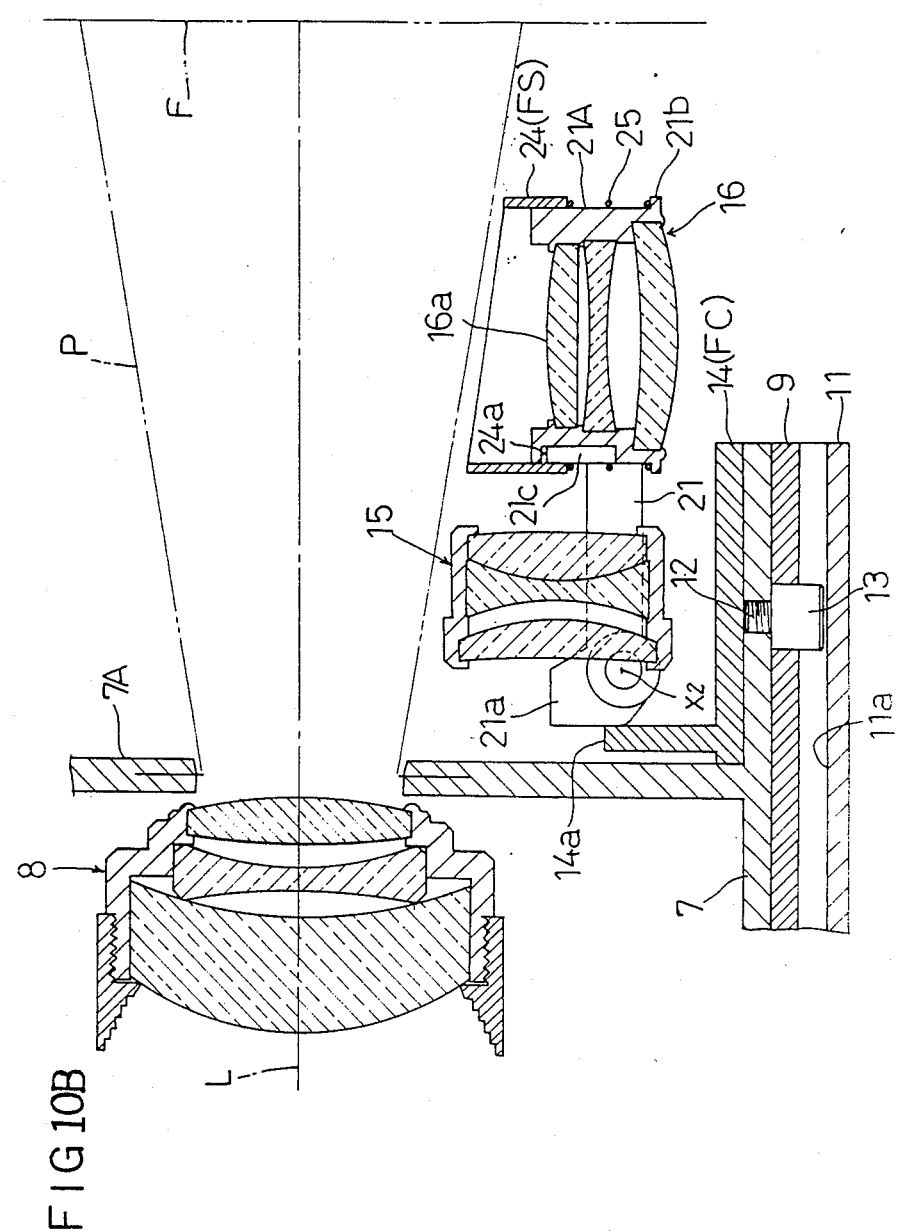

As shown in FIGS. 10A and 10B, the light interrupting ring 24 is slidably mounted on a lens supporting hollow member 21A of support frame 21 supporting the second auxiliary lens component 16. The lens supporting hollow member 21A defines a flange 21b, and a spring 25 is mounted between the light interrupting ring 24 and flange 21b for biasing the light interrupting ring 24 away from the flange 22b. The light interrupting ring 24 includes a pin 24a projecting from an inner periphery thereof. The pin 24a is in engagement with a guide groove 21c defined in the lens supporting hollow member 21A to guide sliding movements of the light interrupting ring 24 and retain the light interrupting ring 24 on the lens supporting hollow member 21A.

As shown in FIG. 10B, the light interrupting ring 24 projects from the lens supporting hollow member 21A under the biasing force of spring 25 when the second auxiliary lens component 16 is retracted from the photographic optical path P. The light interrupting ring 24 in this position effectively prevents the beam having passed through the main lens component 8 from falling on the second auxiliary lens component 16. When the second auxiliary lens component 16 is placed in the photographic optical path P as shown in FIG. 10A, an end of the light interrupting ring 24 abuts on a partition 7A of movable lens support barrel 7. As a result, the light interrupting ring 24 is pushed against the biasing force of spring 25 to a position not projecting from the lens supporting hollow member 21A to permit the second auxiliary lens component 16 to assume a proper position.

Focal length changeover operations will be described next. FIGS. 2A, 4, 5 and 10A illustrate the wide mode wherein the photographic lens assembly 3 has the minimum compound focal length. At this time the mode changeover switch 2 is set to the WIDE position.

In this state, as shown in FIG. 4, the movable lens support barrel 7 is at the minimum distance to the film surface F within its range of movement. On the other hand, as shown in FIG. 5, the cam portion 14a of switching ring 14 contacts only the control pin 19a of the support frame 19 supporting the first auxiliary lens component 5. The first auxiliary lens component 15 is retracted from the photographic optical path P, and the second auxiliary lens component 16 lies in the photographic optical path P. The light interrupting ring 24 is pushed to the position not projecting from the lens supporting hollow member 21A.

When in this state the mode changeover switch 2 is set to the STND position, the motor is rotated and the cam ring 9 begins to rotate counterclockwise in FIG. 3. With this rotation, the roller 13 of movable lens support barrel 7 at an end 9x of the cam groove 9a of cam ring 9 is guided by the cam groove 9a and the straight groove 11a of the stationary barrel 11. As a result, the movable lens support barrel 7 moves along the optical axis L away from the film surface F (in the leftward direction in FIG. 4).

With the rotation of cam ring 9 and the movement of movable lens support barrel 7, the roller 18 provided on the switching ring 14 is guided by the peripheral groove 7a of movable lens support barrel 7 and the straight groove 9b of cam ring 9. At this time the switching ring 14 rotates counterclockwise in FIG. 3 as does the cam ring 9, while moving with the movable lens support barrel 7 away from the film surface F.

With the rotation of switching ring 14, the cam portion 14a contacts the abutment portion 21a formed on the support frame 21 supporting the second auxiliary lens component 16 and retracts the second auxiliary lens component 16 from the photographic optical path P as shown in FIG. 6. At this time the light interrupting ring 24 projects from the lens supporting hollow member 21A to prevent the beam having passed through the main lens component 8 from falling on the second auxiliary lens component 16.

When the roller 18 of movable lens support barrel 7 in engagement with the cam groove 9a of cam ring 9 reaches a bend 9y of the cam groove 9a shown in FIG. 3, the motor is stopped which ends the movement of movable lens support barrel 7 and the rotation of switching ring 14.

At this time, as shown in FIG. 7, the cam portion 14a remains in contact with the control pin 19a formed on the support frame 19 supporting first auxiliary lens component 15. Thus first auxiliary lens component 15 remains retracted from the photographic optical path P. This state corresponds to the standard mode illustrated in FIGS. 2B, 6, 7 and 10B, that is the intermediate focal length state wherein both the first auxiliary lens component 15 and second auxiliary lens component 16 are retracted from the photographic optical path P.

In retracting the first and second auxiliary lens components 15 and 16 from the photographic optical path P as described above, the first auxiliary lens component 15 is pivoted about the axis X1 extending parallel to the optical axis L and the second auxiliary lens component 16 is pivoted about the axis X2 extending parallel to a straight line perpendicular to the optical axis L. This construction is effective to reduce, radially of the photographic lens assembly 3, the accommodating space for the second auxiliary lens component 16 which tends to be relatively large, thereby to provide for a compact construction of the camera.

When retracted from the photographic optical path P, the first and second auxiliary lens components 15 and 16 lie at one side (downward in drawings) with respect to a plane including the optical axis L. More particularly, since the first and second auxiliary lens components 15 and 16 attached to the movable lens support barrel 7 also move with the movable lens support barrel 7 when the movable lens support barrel 7 moves along the optical axis L for effecting focal length changes, other components of the camera cannot be mounted in the accommodating spaces for the two lens components 15 and 16. However, the construction in which the accommodating spaces for the two lens components 15 and 16 are provided at one side as noted above, permits other components of the camera to be mounted in spaces at the other side. The camera is made further compact by arranging the two lens components 15 and 16 to be movable into and out of the photographic optical path P as described above, combined with the accommodating spaces provided therefor at one side.

When changing from the wide mode shown in FIG. 4 to the standard mode shown in FIG. 6, the second auxiliary lens component 16 becomes partly accommodated in a space V1 formed by the movement of movable lens support barrel 7. Thus, the accommodating space for the second auxiliary lens component 16 is minimized for the compactness of the camera, with an effective use of an interior space of the camera rewardly of the photographic lens assembly 3.

When in the standard mode shown in FIGS. 2B, 6, 7 and 10B the mode changeover switch 2 is set to the TELE position, the motor is rotated again and the cam ring 9 begins to further rotate counterclockwise in FIG. 3. With this rotation, the movable lens support barrel 7 moves along the optical axis L away from the film surface F, as in the foregoing situation. The switching ring 14 also further rotates counterclockwise in FIG. 3 while moving with the movable lens support barrel 7 along the optical axis L.

With the rotation of switching ring 14, the cam portion 14a releases the control pin 19a of support frame 19 supporting the first auxiliary lens component 15 whereby the first auxiliary lens component 15 projects into the photographic optical path P as shown in FIG. 9. When the roller 18 of movable lens support barrel 7 reaches a rear end 9z of the cam groove 9a shown in FIG. 3, the motor is stopped which ends the movement of movable lens support barrel 7 and the rotation of switching ring 14.

At this time, as shown in FIG. 9, the cam portion 14a of switching ring 14 remains in contact with the abutment portion 21a of the support frame 21 supporting second auxiliary lens component 16. Thus the second auxiliary lens component 16 remains retracted from the photographic optical path P. The light interrupting ring 24 also remains in the position to prevent the beam from falling on the second auxiliary lens component 16.

FIGS. 2C, 8 and 9 illustrate the telemode with the first auxiliary lens component 15 placed in the photographic optical path P to provide maximum compound focal length. In this state, i.e. after changing from the wide mode shown in FIG. 4 to the telemode shown in FIG. 8, the second auxiliary lens component 16 is almost entirely contained in a space V2 formed by the movement of the movable lens support barrel 7.

Though not described in detail, the standard mode and wide mode are established in sequence by shifting the mode changeover switch 2 to the STND position and then to the WIDE position. At this time, operations reversed from the described operations take place, with a movement of movable lens support barrel 7 toward the film surface F and movements of the first and second auxiliary lens components 15 and 16 relative to the photographic optical path P.

In the foregoing embodiment the light interrupting ring 24 is movable relative to the hollow member 21A supporting the second auxiliary lens component 16, but this construction is not essential. The light interrupting ring 24 may be locked to the second auxiliary lens component 16 if only the second auxiliary lens component 16 can be stationed in a desired position in the photographic optical path P.

While the camera in the foregoing embodiment provides three focal lengths, the above light interrupting ring may be applied to a camera having two focal lengths or to a camera having four or more focal lengths.

Furthermore, in the foregoing embodiment the light interrupting ring 24 acting as light interrupting member FS is attached to the second auxiliary lens component 16. This construction may be varied to have the light interrupting member FS attached to another component such as the movable lens support barrel 7 or the switching ring 14.

Figure 11B:
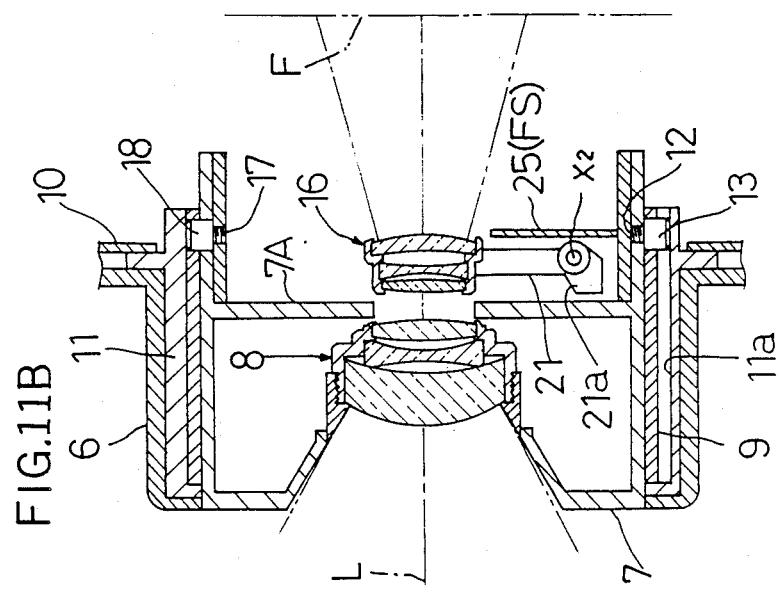
FIGS. 11A and 11B are views showing another embodiment, FIG. 11A being a view in vertical section of a photographic lens assembly in the standard mode corresponding to FIG. 5, and FIG. 11B being a view in vertical section of the photographic lens assembly in the wide mode corresponding to FIG. 6.
Figure 11A:
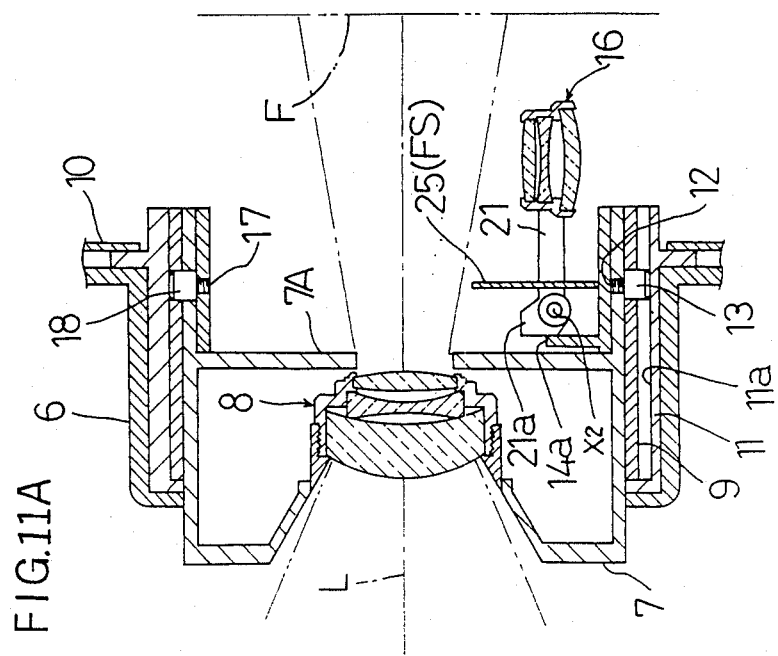

FIGS. 11A and 11B show an embodiment in which two focal lengths are provided. This embodiment includes, attached to the switching ring 14, a light interrupting plate 25 acting as light interrupting member FS corresponding to the light interrupting ring 24 in the preceding embodiment. An auxiliary lens component 16 lying in the photographic optical path P in FIG. 11A is movable over the light interrupting plate 25 when retracted from the photographic optical path P as shown in FIG. 11B.

The light interrupting ring in the preceding embodiment is attached to the auxiliary lens component 16 which in combination with the main lens component 8 provides a shorter compound focal length than the focal length of the main lens component 8 alone. However, the light interrupting ring may be attached to the auxiliary lens component which in combination with the main lens component 8 provides a longer compound focal length than the focal length of the main lens component 8 alone.

The construction for moving the first and second auxiliary lens components 15 and 16 into and out of the photographic optical path P may be varied as appropriate. Some examples of this construction will be described next. Like components are affixed with like reference numerals and will be described again only where necessary.

Referring to FIGS. 12 and 13, the first and second auxiliary lens components 15 and 16 are pivotable about axes X1 and X3 extending parallel to the optical axis L, respectively, to move into and out of the photographic optical path P. When retracted, the two auxiliary lens components 15 and 16 are opposed to each other across a plane including the optical axis L.

A support frame 24 supporting the second auxiliary lens component 16 includes a control pin 24a at an end thereof opposite the second auxiliary lens component 16 across the axis X3. This control pin 24a is contacted and pushed by the cam portion 14a of the rotatable switching ring 14, whereby the second auxiliary lens component 16 is retracted from the photographic optical path P against the biasing force of spring 25.

In FIG. 13, as in the preceding embodiment, the two dot and dash line indicates a section of the photographic optical path P at the position of the first auxiliary lens component 15.

The focal length is variable in this embodiment by rotating the switching ring 14 as in the preceding embodiment. The standard mode illustrated in FIG. 13 is switchable to the wide mode by rotating the switching ring 14 clockwise and to the telemode by rotating the switching ring 14 counterclockwise.

FIGS. 14 and 15 show another example in which the first and second auxiliary lens components 15 and 16 are pivotable about axes X1 and X4 extending parallel to the optical axis L, respectively, to move into and out of the photographic optical path P. When retracted, the two auxiliary lens components 15 and 16 are on the same side (downward in drawings) of the plane including the optical axis L.

The mounting structure for the second auxiliary lens component 16 is substantially the same as in the foregoing example, and comprises a support frame 26 supporting the second auxiliary lens component 16 and including a control pin 26a. The control pin 26a is contacted and pushed by the cam portion 14a of the rotatable switching ring 14, whereby the second auxiliary lens component 16 is retracted from the photographic optical path P against the biasing force of a spring 27.

In FIG. 15, the dot and dash line indicates a section of the photographic optical path P at the standard mode position of the first auxiliary lens component 15, and the two dot and dash line indicates a section of the photographic optical path P at the telemode position of the second auxiliary lens component 16.

The focal length is variable similarly. The standard mode illustrated in FIG. 15 is switchable to the wide mode by rotating the switching ring 14 clockwise and to the telemode by rotating the switching ring 14 counterclockwise.

In this construction, the second auxiliary lens component 16 has a relatively large diameter. In order to achieve compactness of the camera while avoiding the second auxiliary lens component 16 vignetting the photographic optical path P, the movable lens support barrel 7 and switching ring 14 are partly cut out as shown in a phantom line in FIG. 14.

The focal length may be varied mechanically by means of a manual control lever instead of using the motor as in the preceding embodiments.

In the preceding embodiments, the second auxiliary lens component 16 is attached to movable lens support barrel 7 to be pivotable on the axis X2 so that the second auxiliary lens component 16 is turned over rearwardly along the optical axis L to retract from the photographic optical path P.

Figure 17:
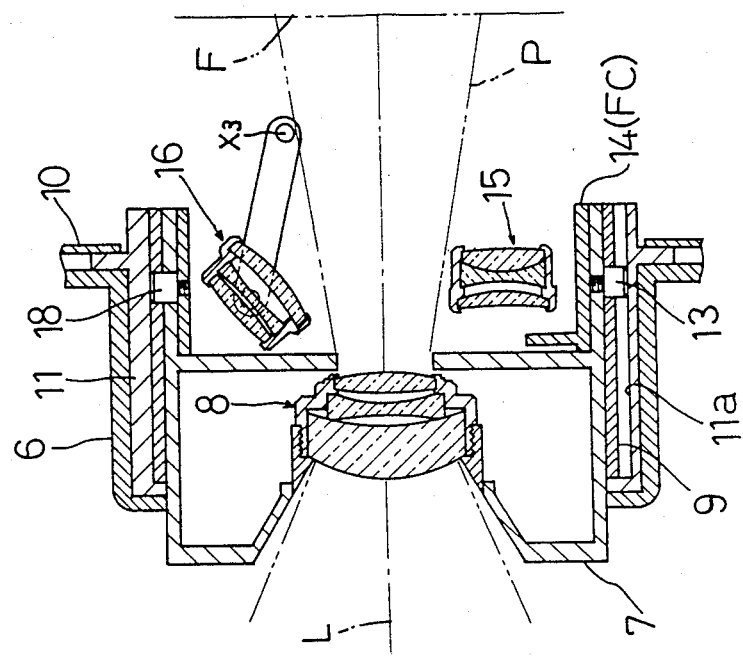
FIG. 17 is a view in cross section of the photographic lens assembly of FIG. 16 in the standard mode, which corresponds to FIG. 6.
Figure 16:
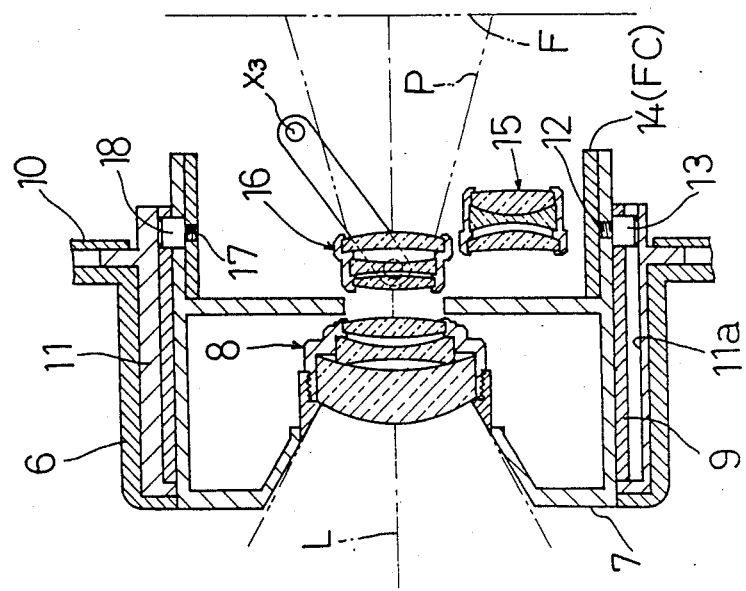
FIG. 16 is a view in vertical section of a photographic lens assembly in the wide mode according to a still further embodiment, which corresponds to FIG. 4.

FIGS. 16 and 17 show a modification of this construction, wherein the second auxiliary lens component 16 is attached to the camera body. In FIG. 16, the second auxiliary lens component 16 lies in the photographic optical path P rearwardly of the main lens component 8 supported by the movable lens support barrel 7 at a rear limit on the optical axis L. FIG. 17 shows the main lens component 8 at a front limit on the optical axis L with the second auxiliary lens component 16 retracted from the photographic optical path P. This position is assumed after the second auxiliary lens component 16 is pivoted forwardly with respect to the optical axis L about the axis X3 extending parallel to a straight line perpendicular to the optical axis L.

While the camera in each of the described embodiments provides three focal lengths, the present invention is applicable to a camera having two focal lengths or to a camera having four or more focal lengths. The focal length may be varied mechanically by means of a manual control lever instead of using the motor as in the preceding embodiments.

The auxiliary lens component 16 in the described embodiments, which is containable in the space formed with a movement of the movable lens support barrel, establishes in combination with the main lens component 8 a shorter compound focal length than the focal length of the main lens component 8 alone. However, the auxiliary lens component containable in that space may establish in combination with the main lens component 8 a longer compound focal length than the focal length of the main lens component 8 alone.

In the embodiments described hereinbefore, the best construction for realizing varied focal lengths according to the present invention has for the basis the lens system provided by the main lens component for standard photography, and enables telephotography by the combination of the main lens component and the first auxiliary lens component and wide angle photography by the combination of the main lens component and the second auxiliary lens component. In addition to the above, the lens components may be combined in four ways as set out hereinafter. For expediency of discussion, the three different focal lengths irrespective of film sizes are termed wide angle photography, standard photography and telephotography in the order from the short focal length to the long focal length.

(i) The main lens component provides wide angle photography on its own. The first auxiliary lens component provides standard photography in cooperation with the main lens component. The second auxiliary lens component provides telephotography in cooperation with the main lens component and the first auxiliary lens component.

(ii) The main lens component provides wide angle photography on its own. The first auxiliary lens component provides standard photography in co-operation with the main lens component. The second auxiliary lens component provides telephotography in cooperation with the main lens component.

(iii) The main lens component provides telephotography on its own. The first auxiliary lens component provides standard photography in cooperation with the main lens component. The second auxiliary lens component provides wide angle photography in cooperation with the main lens component and the first auxiliary lens component.

(iv) The main lens component provides telephotography on its own. The first auxiliary lens component provides standard photography in cooperation with the main lens component. The second auxiliary lens component provides wide angle photography in cooperation with the main lens component.

However, compared with the foregoing embodiments these constructions have the following disadvantages:

In the construction (i) the lens system providing wide angle photography forms the basis, and the two auxiliary lens components are added thereto to provide standard photography and telephotography, respectively. Therefore, the lens system for telephotography has a focal length greatly varied from the focal length of the basic lens system, which results in a great negative value of Petzval sum and a great curvature of image field. Further, the three lens components are arranged in a line in the lens system for telephotography, and this increases the total length of the photographic lens assembly.

In the construction (ii), as in the construction (i), the lens system for telephotography has a focal length greatly varied from the focal length of the basic lens system for wide angle photography, and which results in a great negative value of Petzval sum and a great curvature of image field. Since the great variation in the focal length is effected by the second auxiliary lens component alone, the second auxiliary lens component must have a great magnification. Consequently, the second auxiliary lens component has a complicated construction and even a slight error tends to deteriorate the image-forming characteristics.

While the construction (i) has for the basis the lens system providing wide angle photography, the construction (iii) has for the basis the lens system providing telephotography. This is the only difference between the two constructions. The focal length is varied similarly, and therefore the lens system for wide angle photography involves a great curvature of image field and a long total length of the photographic lens assembly. Besides, since the second auxiliary lens component provides wide angle photography in cooperation with the first auxiliary lens component and the main lens component, the second auxiliary lens component tends to have a large lens aperture. Thus, the second auxiliary lens component itself is expensive and may be obstructive to the compactness of the camera by requiring a large accommodating space when retracted from the photographic optical path.

The construction (iv) differs from the construction (ii) only in that the basis is changed from the lens system for wide angle photography to the lens system for telephotography. Thus, as with the construction (ii), the second auxiliary lens component has a complicated construction, a slight error may deteriorate the image-forming characteristics, and the curvature of image field is large. In addition, as with the construction (iii), the second auxiliary lens component tends to have a large lens aperture, and therefore the second auxiliary lens component may be expensive and obstructive to the compactness of the camera.

Whilst the present invention has been described by referring to the embodiments illustrated in the accompanying drawings, various modifications may be made by those skilled in the art without departing from the spirit and scope of the invention as defined in the appended claims.

What is claimed is:

1. A camera comprising:
   a main lens component disposed in a photographic optical path;
   a first auxiliary lens component movable into and out of the photographic optical path and cooperable with said main lens component to provide a long focal length;

a second auxiliary lens component movable into and out of the photographic optical path and cooperable with said main lens component to provide a short focal length;

means for selecting one of the long focal length, the short focal length and an intermediate focal length; and control means operable in response to said selecting means to bring said second auxiliary lens component into the photographic optical path and retract said first auxiliary lens component from the photographic optical path when the short focal length is selected, to retract both of said first auxiliary lens component and said second auxiliary lens component from the photographic optical path when the intermediate focal length is selected, and to bring said first auxiliary lens component into the photographic optical path and retract said second auxiliary lens component from the photographic optical path when the long focal length is selected.

2. A camera as claimed in claim 1, wherein said main lens component is movable along an optical axis, and said control means is operable to place said main lens component in a first position and said second auxiliary lens component rearwardly of said main lens component when the short focal length is selected, to place said main lens component in a second position forwardly of the first position and retract said first auxiliary lens component and said second auxiliary lens component from the photographic optical path when the intermediate focal length is selected, and to place said main lens component in a third position forwardly of the second position and said first auxiliary lens component rearwardly of said main lens component when the long focal length is selected.

3. A camera as claimed in claim 2, wherein a ratio of the focal length provided by said main lens component and said first auxiliary lens component in combination with respect to the focal length of said main lens component is substantially equal to a ratio of the focal length of said main lens component with respect to the focal length provided by said main lens component and said second auxiliary lens component in combination.

4. A camera as claimed in claim 2, wherein said first auxiliary lens component and said second auxiliary lens component, when retracted, are both disposed in one of spaces divided by a plane including the optical axis of said main lens component.

5. A camera as claimed in claim 2, wherein said control means includes first drive means for moving said first auxiliary lens component into and out of the photographic optical path by causing said first auxiliary lens component to pivot about an axis extending parallel to the optical axis of said main lens component, and second drive means for moving said second auxiliary lens component into and out of the photographic optical path by causing said second auxiliary lens component to pivot about an axis extending parallel to a straight line perpendicular to the optical axis of said main lens component.

6. A camera as claimed in claim 5, wherein said second drive means is operable to retract said second auxiliary lens component into a space including a room to be occupied by said main lens component at said first position and/or second position when the intermediate focal length and/or long focal length are/is provided.

7. A camera as claimed in claim 5, further comprising a light interrupting member for preventing a beam having passed through said main lens component from falling on said second auxiliary lens component when said second auxiliary lens component is retracted.

8. A camera as claimed in claim 7, wherein said light interrupting member is attached to an element supporting said second auxiliary lens component.

9. A camera comprising:
a main lens component disposed in a photographic optical path;
an auxiliary lens component movable into and out of the photographic optical path and cooperable with said main lens component to provide a short focal length;
means for selecting one of the short focal length and a long focal length; and
control means operable in response to said selecting means to place said main lens component in a first position and said auxiliary lens component rearwardly of said main lens component when the short focal length is selected, and when the long focal length is selected to place said main lens component in a second position forwardly of the first position and to retract said auxiliary lens component from the photographic optical path into a space, a portion of which is occupied by said main lens component when the main lens component is at the first position.

10. A camera comprising:
a main lens component disposed in a photographic optical path;
an auxiliary lens component moveable into and out of the photographic optical path and cooperable with said main lens component to provide a short focal length;
means for selecting one of the short focal length and a long focal length;
control means operable in response to said selecting means to place said main lens component in a first position and said auxiliary lens component rearwardly of said main lens component when the short focal length is selected, and to place said main lens component in a second position forwardly of the first position and retract said auxiliary lens component from the photographic optical path when the long focal length is selected; and
a light interrupting member stationarily mounted relative to said main lens component for preventing a beam having passed through said main lens component from falling on said second auxiliary lens component when the long focal length is selected and said auxiliary lens component is retracted.

11. A camera comprising:
a main lens component disposed in a photographic optical path for providing a first focal length;
a first auxiliary lens component movable into and out of the photographic optical path and cooperable with said main lens component to provide a second focal length;
a second auxiliary lens component movable into and out of the photographic optical path and cooperable with said main lens component to provide a third focal length;
means for selecting one of the first, second and third focal lengths; and
control means including a mechanism for moving said first auxiliary lens component into and out of the photographic optical path by causing said first auxiliary lens component to pivot about an axis extending parallel to an optical axis of said main lens component, and a mechanism for moving said second auxiliary lens component into and out of the photographic optical path by causing said second auxiliary lens component to pivot about an axis extending parallel to a straight line perpendicular to the optical axis of said main lens component, said control means being operable in response to said switching means to retract said first auxiliary lens component and said second auxiliary lens component from the photographic optical path when the first focal length is selected, to bring said first auxiliary lens component into the photographic optical path and retract said second auxiliary lens component from the photographic optical path when the second focal length is selected, and to bring said second auxiliary lens component into the photographic optical path and retract said first auxiliary lens component from the photographic optical path when the third focal length is selected.

12. A camera as claimed in claim 11, further comprising a light interrupting member for preventing a beam having passed through said main lens component from falling on said second auxiliary lens component when said second auxiliary lens component is retracted.

13. A camera as claimed in claim 12, wherein said light interrupting member is attached to an element supporting said second auxiliary lens component.

14. A camera as claimed in claim 11, wherein said first auxiliary lens component and said second auxiliary lens component, when retracted, are both disposed in one of spaces divided by a plane including the optical axis of said main lens component.

15. A camera comprising:
a main lens component disposed in a photographic optical path for providing a first focal length;
a first auxiliary lens component movable into and out of the photographic optical path and cooperable with said main lens component to provide a second focal length;
a second auxiliary lens component movable into and out of the photographic optical path and cooperable with said main lens component to provide a third focal length;
means for selecting one of the first, second and third focal lengths; and
control means including a mechanism for retracting said first auxiliary lens component and said second auxiliary lens component both into one of spaces divided by a plane including an optical axis of said main lens component, said control means being operable in response to said switching means to retract said first auxiliary lens component and said second auxiliary lens component from the photographic optical path when the first focal length is selected, to bring said first auxiliary lens component into the photographic optical path and retract said second auxiliary lens component from the photographic optical path when the second focal length is selected, and to bring said second auxiliary lens component into the photographic optical path and retract said first auxiliary lens component from the photographic optical path when the third focal length is selected.

16. A camera comprising:
a main lens component disposed in a photographic optical path;
an auxiliary lens component rotatably supported around an axis perpendicular to the optical axis of the main lens component and movable into and out of the photographic optical path and cooperable with said main lens component to provide a short focal length;
means for selecting one of the short focal length and a long focal length;
control means operable in response to said selecting means to place said main lens component in a first position and said auxiliary lens component rearwardly of said main lens component when the short focal length is selected, and to place said main lens component in a second position forwardly of the first position and retract said auxiliary lens component from the photographic optical path when the long focal length is selected; and
light interrupting means provided fixedly on an element supporting said auxiliary lens component for preventing a beam having passed through said main lens component from falling on said second auxiliary lens component when the long focal length is selected and said auxiliary lens component is retracted.

* * * * *